US012614282B2

(12) United States Patent　　(10) Patent No.: US 12,614,282 B2
Manganelli et al.　　(45) Date of Patent:　Apr. 28, 2026

(54) METHOD AND ELECTRONIC DEVICE FOR GENERATING A MACHINE LEARNING TRAINING DATASET FOR SHADOW DIRECTION AND REMOVAL

(71) Applicant: SAMSUNG ELECTRONICS CO., LTD., Suwon-si (KR)

(72) Inventors: Bruno Manganelli, Staines (GB); Albert Saa-Garriga, Staines (GB); Mehmet Kerim Yucel, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 514 days.

(21) Appl. No.: 18/117,246

(22) Filed: Mar. 3, 2023

(65) Prior Publication Data

US 2023/0281823 A1　　Sep. 7, 2023

(30) Foreign Application Priority Data

Mar. 4, 2022　(GB) ..................................... 2203052
Sep. 23, 2022　(GB) ..................................... 2213902

(51) Int. Cl.
*G06T 7/11*　　(2017.01)
*G06V 10/88*　　(2022.01)

(52) U.S. Cl.
CPC ................ *G06T 7/11* (2017.01); *G06V 10/88* (2022.01); *G06T 2207/20081* (2013.01)

(58) Field of Classification Search
None
See application file for complete search history.

(56) References Cited

U.S. PATENT DOCUMENTS

2014/0341464 A1　11/2014　Fan et al.
2019/0385338 A1　12/2019　Estrada et al.
2020/0167966 A1 *　5/2020　Kim ....................... G06N 20/10
2021/0133510 A1　5/2021　Boulanger
(Continued)

FOREIGN PATENT DOCUMENTS

CN　　114037666 A　　2/2022
CN　　114266713 A　　4/2022
KR　　10-1995523 B1　10/2019

OTHER PUBLICATIONS

Hu et al., "Mask-ShadowGAN: Learning to Remove Shadows from Unpaired Data," arXiv:1903.10683v3, IEEE International Conference on Computer Vision (ICCV), pp. 2472-2481, 2019 (Year: 2019).*

(Continued)

*Primary Examiner* — Soo Shin
(74) *Attorney, Agent, or Firm* — Sughrue Mion, PLLC

(57) ABSTRACT

Broadly speaking, embodiments of the present techniques provide methods for performing shadow detection and/or removal in images. In particular, the present techniques provide a computer-implemented method for generating a synthetic training dataset for training a machine learning, ML, model using federated learning to perform shadow detection (and optionally removal), and methods for training the ML model using the generated training dataset. Advantageously, the method to generate a training dataset enables a diverse training dataset to be generated while maintaining user data privacy, where the diversity refers to the variety of scenes containing shadows.

20 Claims, 20 Drawing Sheets

(56)     References Cited

U.S. PATENT DOCUMENTS

2021/0227096 A1\*    7/2021   Lin ............................. G06T 5/80
2023/0368071 A1\*   11/2023   Yucel ................... G06N 3/0464

OTHER PUBLICATIONS

Le et al., "From Shadow Segmentation to Shadow Removal," Springer Nature Switzerland AG 2020, A. Vedaldi et al. (Eds.): ECCV 2020, LNCS 12356, pp. 264-281, 2020. (Year: 2020).\*
Communication dated Mar. 21, 2023, issued by United Kingdom Patent Office in United Kingdom Patent Application No. 2213902.6.
Kangjik Kim et al., "A method of generating virtual shadow dataset of buildings for the shadow detection and removal", Journal of Internet Computing and Services(JICS) 2020, Oct. 31, 2020, pp. 49-56, http://dx.doi.org/10.7472/jksii.2020.21.5.49, (8 pages total).
Jifeng Wang et al., "Stacked cConditional Generative Adversarial Networks for Jointly Learning sShadow Detection and Shadow Removal" In Proceedings of the IEEE Conference on Computer Vision and Pattern Recognition, pp. 1788-1797, Jun. 2018, (10 pages total).
Naoto Inoue et al., "Learning from Synthetic Shadows for Shadow Detection and Removal", IEEE Transactions on Circuits and Systems for Video Technology, arXiv:2101.01713v1 [cs.CV], Jan. 5, 2021, (11 pages total).
Liangqiong Qu et al., "DeshadowNet: A Multi-context Embedding Deep Network for Shadow Removal", In Proceedings of the IEEE Conference on Computer Vision and Pattern Recognition, pp. 4067-4075, Jul. 2017, (9 pages total).
Mehmet Kerim Yucel et al., "Real-time Monocular Depth Estimation with Sparse Supervision on Mobile", In Proceedings of the IEEE/CVF Conference on Computer Vision and Pattern Recognition, pp. 2428-2437, Jun. 2021, (10 pages total).
Kaiming He et al., "Delving Deep into Rectifiers: Surpassing Human-Level Performance on ImageNet Classification", In Proceedings of the IEEE International Conference on Computer Vision, pp. 1026-1034, Feb. 2015, (9 pages total).

\* cited by examiner

102

104

Input image          SDN output          SF patches isolation
                                              (filtered)

Image Patch     Darkened     Shadowed

Shadow Mask

Synthetic Training Dataset Generation

Training ML model by client device

FIG. 13A

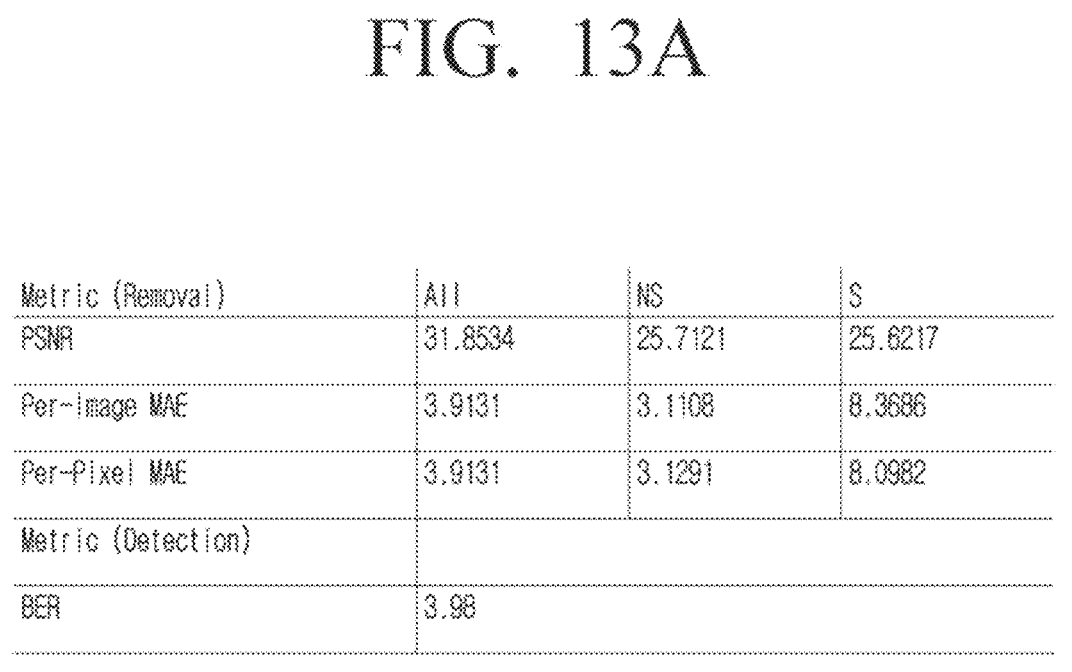

| Metric (Removal) | All | NS | S |
| --- | --- | --- | --- |
| PSNR | 31.8534 | 25.7121 | 25.6217 |
| Per-Image MAE | 3.9131 | 3.1108 | 8.3686 |
| Per-Pixel MAE | 3.9131 | 3.1291 | 8.0982 |
| Metric (Detection) | | | |
| BER | 3.98 | | |

FIG. 13B

| Metric (Removal) | All | NS | S |
|---|---|---|---|
| PSNR | 33.8316 | 25.9511 | 26.0247 |
| Per-Image MAE | 3.1518 | 2.5893 | 6.6187 |
| Per-Pixel MAE | 3.1518 | 2.5925 | 6.1378 |
| Metric (Detection) | | | |
| BER | 2.15 | | |

FIG. 14A

| Metric (Removal) | All | NS | S |
|---|---|---|---|
| PSNR | 32.9149 | 25.8686 | 25.7699 |
| Per-Image MAE | 3.2196 | 2.4833 | 7.8786 |
| Per-Pixel MAE | 3.2196 | 2.4639 | 7.5378 |
| Metric (Detection) | | | |
| BER | 1.82 | | |

FIG. 14B

| Metric (Removal) | All | NS | S |
|---|---|---|---|
| PSNR | 34.6698 | 26.0605 | 26.1608 |
| Per-Image MAE | 2.9646 | 2.4344 | 6.0658 |
| Per-Pixel MAE | 2.9646 | 2.4313 | 5.8113 |
| Metric (Detection) | | | |
| BER | 1.64 | | |

METHOD AND ELECTRONIC DEVICE FOR GENERATING A MACHINE LEARNING TRAINING DATASET FOR SHADOW DIRECTION AND REMOVAL

CROSS-REFERENCE TO RELATED APPLICATION(S)

This application is based on and claims priority under 35 U.S.C. § 119 to United Kingdom Application No. 2203052.2, filed on Mar. 4, 2022, and United Kingdom Application No. 2213902.6, filed on Sep. 23, 2022, the disclosures of which are incorporated by reference herein in their entireties.

BACKGROUND

1. Field

The present techniques generally relate to a method for detecting and removing shadows in images. Specifically, the present techniques provide a method for generating a training dataset to train a model for shadow detection and removal, and a method for using this training dataset to train the model.

2. Description of the Related Art

Shadow detection and removal are of paramount importance in computer vision. Shadows are formed due to the interaction between occluder objects and light sources. Shadow intensity and location can provide useful clues, such as lighting settings, geometry, and camera information, but can also harm various vision tasks, either due to poor visibility or shadow-induced phantom objects. Therefore, shadow detection and removal remain difficult yet important problems to solve.

Following earlier methods based on image formation models, deep learning approaches have been proposed for shadow detection and removal. In addition to tackling detection and removal individually, there are few methods performing both tasks jointly. There are two primary issues in the field; (i) the existing methods fail to prevent reconstructing non-shadow areas, and (ii) the available datasets are quite small. The former leads to inefficient use of network capacity, whereas the latter harms generalization across various scenarios.

Machine learning methods represent the state-of-the-art in the overwhelming majority of computer vision tasks today. However, usually, machine learning methods require a large amount of training data to achieve good results. In the case of shadow removal, training data usually consists of a shadowed and shadow-free version of the same image. This sort of training data is extremely difficult and time-consuming to produce because the process of creating such data consists of taking a shaded and shadow-free image of a scene. Creating such training data often involves photographing an object with and without shadows. This method lacks variety in the types of scenery represented (in terms of both the object and background), as well as the shape of the shadows produced. Moreover, physically taking these kinds of images means that the camera used has to be perfectly still in order to capture exactly the same scene. Additionally, there will always be some noise present, for example, from the camera's sensor, which means that it is impossible to achieve a one-to-one pixel correspondence between the shadowed and shadow-free image.

The present applicant has therefore identified the need for an improved method for generating data for shadow detection and removal.

SUMMARY

In a first approach of the present techniques, there is provided a computer-implemented method, performed by a client device, for generating a training dataset for training a machine learning, ML, model to perform image shadow detection and/or shadow removal, the method comprising: obtaining a plurality of images of scenes; and using a pre-trained shadow detection model to generate a training dataset by: obtaining a shadow mask in each image of the plurality of images; determining whether the obtained shadow mask satisfies criteria for adding the shadow mask to a database of shadow masks on the client device, the database of shadow masks forming or being used to generate the training dataset; and when the criteria are satisfied by the obtained shadow mask for an image: adding the obtained shadow mask to the database of shadow masks; detecting at least one shadow-free image region in the image; and extracting and adding the at least one shadow-free image region to a database of shadow-free patches, the database of shadow-free patches forming or being used to generate the training dataset.

The present techniques provide a new dataset generation pipeline to address dataset size limitations. In addition to small real-life benchmarks, larger synthetic alternatives are present but they lack image variety (in shadow-free images), limiting the reach of proposed methods. This problem is addressed with an idea that scales gracefully: collect images from various sources, extract shadow free patches by automatically filtering shadow areas, and synthesize shadows on these patches. Advantageously, the present techniques: achieve generalization, by allowing the use of highly diverse training images; achieve high-performance, by iteratively improving the dataset and model; and produce a shadow detection and removal synthetic dataset that is highly useful for pretraining.

The obtained shadow mask and the corresponding at least one shadow-free image region may form the training dataset themselves. In this case, the training dataset may be used to generate synthetic data that is then used for training the ML model. Alternatively, the obtained shadow mask and the corresponding at least one shadow-free image region may be used to generate synthetic data which forms the training dataset. In each case, the training dataset comprises synthetic data generated via image processing techniques described in more detail below, which overcomes the above-mentioned problems with existing real-life data.

In some cases, the method may comprise training the ML model using federated learning. In a federated learning scenario, the present techniques avoid data collection issues, by creating a dataset from user photos and training on-device, and achieve high specificity, by collecting images that are representative of the final usage setting. In other cases, the ML model may be trained centrally on a server without federated learning.

Furthermore, the present techniques provide a complete pipeline that generates models that are state-of-the-art in shadow detection and removal. The dataset is generated from any images, without significant effort and free of licensing issues. Synthetic datasets are generated from photo images that are highly representative of the images on which the final model will be used (device photos).

Detecting at least one shadow-free image region in the obtained image may comprise: using the obtained shadow mask to isolate at least one region in the obtained image that contains shadow-free pixels.

Isolating regions that contain shadow-free pixels may comprise isolating regions of at least a predefined minimum size.

The method may further comprise filtering the isolated regions to remove similar or overlapping regions.

The method may further comprise adding the isolated regions that remain after the filtering to the database of shadow-free patches.

Alternatively, the method may further comprise checking for shadows in the isolated regions that remain after the filtering by using the pre-trained shadow detection model. Then, the method may comprise extracting and adding any isolated regions to the database of shadow-free patches that the checking determines to be free of shadows.

The method may further comprise: determining whether there is sufficient space in the database of shadow-free patches to store the shadow-free image regions; and when it is determined there is insufficient space in the database of shadow-free patches to store the shadow-free image regions, the method further comprises: calculating image metrics for the shadow-free image regions; identifying whether there is a lower priority shadow-free image region in the database; and removing the lower priority image and storing the shadow-free image region in the database of shadow-free patches, when a lower priority shadow-free image region is identified.

Generally speaking, for shadow detection, the training dataset comprises an image containing shadows (the input into the ML model) and a shadow mask (the ground truth the ML model has to predict). For shadow removal, the training dataset comprises an image containing shadows (the input into the ML model) and the shadow-free image (the ground truth the ML model has to predict). However, it may also be beneficial to provide the shadow mask to guide the shadow removal training, or to produce a model that performs both shadow detection and removal. In this case, the training data set comprises an image containing shadows (input) and the two ground truths that the network would predict are the shadow mask and the shadow-free images. Thus, producing triplets of data allows the training of either of these model types, but only pairs of data are required for a particular task.

In some cases, the database of shadow-free patches and the database of shadow masks may be used to generate the training dataset by adding the obtained shadow mask and the at least one shadow-free image region to the training dataset as data pairs.

Alternatively, as noted above, the database of shadow-free patches and the database of shadow masks may be used to generate synthetic data (images) that forms the training dataset. Thus, the method may further comprise: generating a synthetic image having a shadow using a shadow-free image region from the database of shadow-free patches and a shadow mask from the database of shadow masks. In this case, the synthetic image and the shadow mask used to generate the synthetic image may be added to the training dataset as data pairs.

The generating may comprise applying the shadow mask to the shadow-free image region to form a darker area in the shadow-free image region.

The generating may comprise applying at least one transformation to the shadow-free image region prior to applying the shadow mask. The at least one transformation may be used to for any one of the following: reduce brightness, change contrast, change saturation, and change hue.

The method may further comprise adding the generated synthetic image to the training dataset.

In a second approach of the present techniques, there is provided a client device for generating a training dataset for training a machine learning, ML, model to perform image shadow detection and/or removal, the client device comprising: an image capture device, for capturing images of scenes; storage comprising a plurality of databases forming or being used to generate a training dataset for training the ML model; and at least one processor coupled to memory and arranged to: use a pre-trained shadow detection model to generate a training dataset by: obtaining a shadow mask in each image of the plurality of images; determining whether the obtained shadow mask satisfies criteria for adding the shadow mask to a database of shadow masks stored in the storage on the client device; and when the criteria are satisfied by the shadow mask obtained for an image: adding the obtained shadow mask to the database of shadow masks; detecting at least one shadow-free image region in the image; and extracting and adding the at least one shadow-free image region to a database of shadow-free patches stored in the storage on the client device.

The features described above with respect to the first approach apply equally to the second approach and therefore, for the sake of conciseness, are not repeated.

In a third approach of the present techniques, there is provided a computer-implemented method, performed by a client device, for training a machine learning, ML, model using federated learning to perform image shadow detection and/or removal, the method comprising: obtaining a pre-trained shadow detection model from a central server; using the pre-trained shadow detection model to generate a training dataset using the method recited herein; using the generated training dataset to train the ML model; and sharing model weights of the trained ML model with the central server to update the ML model; and receiving the updated ML model from the central server.

The method may further comprise: checking whether computational resources of the client device are available to train the ML model; and training the ML model when the resources are available.

Sharing model weights of the trained ML model with a central server may comprise: transmitting the model weights to the central server directly.

Alternatively, sharing model weights of the trained ML model with a central server may comprise: transmitting the model weights to at least one other client device of a plurality of client devices using a peer-to-peer distribution mechanism, wherein one client device of the plurality of client devices aggregates all model weights and transmits the aggregated model weights to the central server.

In a fourth approach of the present techniques, there is provided a client device for training a machine learning, ML, model using federated learning to perform image shadow detection and/or removal, the client device comprising: at least one processor coupled to memory and arranged to: obtain a pre-trained shadow detection model from a central server; use the pre-trained shadow detection model to generate a training dataset using the method recited herein; use the training dataset to train the ML model; and share model weights of the trained ML model with the central server to update the ML model; and receive the updated ML model from the central server.

In a fifth approach of the present techniques, there is provided a system for training a machine learning, ML, model using federated learning to perform image shadow detection and/or removal, the system comprising: a central server comprising at least one processor coupled to memory to obtain and store an ML model for training; a plurality of client devices, each client device comprising at least one processor coupled to memory and arranged to: obtain a pre-trained shadow detection model and ML model from the central server; use the pre-trained shadow detection model to generate a training dataset using the method recited herein; use the training dataset to train the ML model; and share model weights of the trained ML model with the central server to update the ML model; and receive the updated ML model from the central server.

The features described above with respect to the third approach apply equally to the fourth and fifth approaches and therefore, are not repeated.

In a related approach of the present techniques, there is provided a computer-readable storage medium comprising instructions which, when executed by a processor, causes the processor to carry out the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIGS. 13A and 13B show how using a synthetic shadow dataset can improve various performance metrics; and FIGS. 14A and 14B show the performance improvement that can be achieved when using a synthetic dataset on an enhanced internal architecture.

DETAILED DESCRIPTION

Broadly speaking, embodiments of the present techniques provide methods for performing shadow detection and/or removal in images. In particular, the present techniques provide a computer-implemented method for generating a training dataset for training a machine learning, ML, model to perform shadow detection (and optionally removal), and methods for training the ML model using the generated training dataset. Advantageously, the method to generate a training dataset enables a diverse training dataset to be generated while maintaining user data privacy, where the diversity refers to the variety of scenes containing shadows. The training dataset comprises synthetic data, which can be more diverse than real-life data.

Figure 1A:
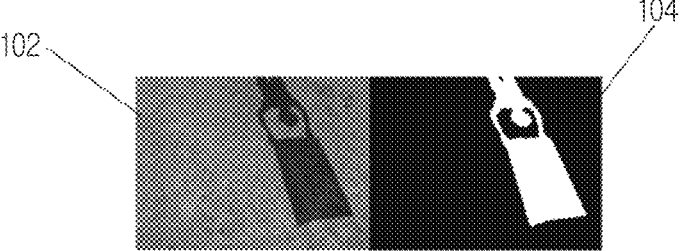
FIGS. 1A to 1C show examples of training data for shadow detection and removal.
Figure 1B:
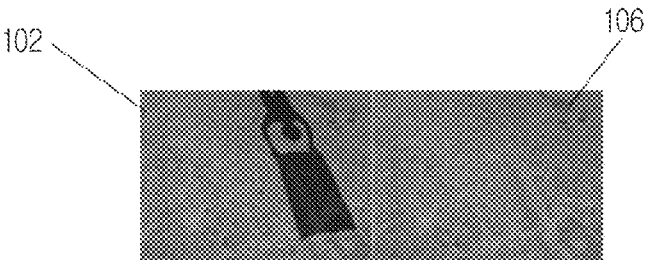
Figure 1C:
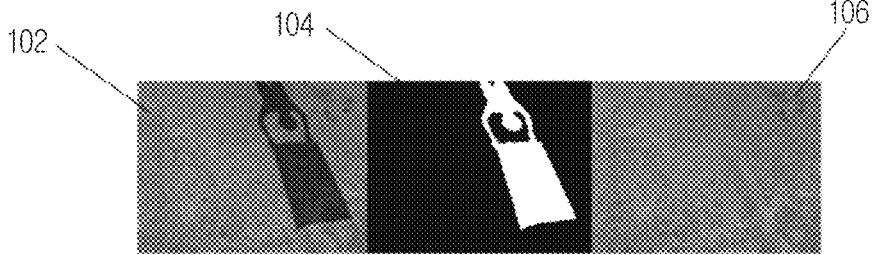

FIGS. 1A to 1C show examples of training data for shadow detection and removal. Shadow detection is the task of detecting shadows in an image. The output of a shadow detection process may be a shadow mask that maps each pixel of the image as being inside or outside a shadow area. Shadow removal is the task of removing shadows from an image. The output of a shadow removal process may be an image which has had shadows removed from it, i.e. a shadow-free image.

To train a ML model to detect and remove shadows requires an appropriate training dataset. FIG. 1A shows an example pair of training data, 102, 104, for shadow detection. (The images are taken from the ISTD dataset, see Wang, J., Li, X., & Yang, J. (Stacked conditional generative adversarial networks for jointly learning shadow detection and shadow removal. In *Proceedings of the IEEE Conference on Computer Vision and Pattern Recognition*, 2018, pp. 1788-1797)). Only pairs of images are required. Each pair comprises an input image 102 that contains shadows (also referred to as a "shadowed image" herein), and a ground truth mask 104 that classifies each pixel of the input image as being inside or outside of a shadow area.

To train a ML model to remove shadows from a shadowed image also requires an appropriate training dataset. FIG. 1B shows an example pair of training data, 102, 106 for shadow removal. Each pair of training data comprises an input image 102 that contains shadows and a shadow-free image 106 (i.e. a ground truth image without the shadows). Alternatively, FIG. 1C shows an example triplet of training data, 102, 104, 106 for shadow removal. Each triplet of training data comprises an input image 102 that contains shadows, a ground truth mask 104, and a shadow-free image 106 (i.e. a ground truth image without the shadows). The ground truth mask 104 may aid the training via intermediate objectives.

There are very few existing shadow datasets, and those that do exist are very small and/or have little variation in the type of scenes and objects shown. Thus, the present techniques provide methods to create a synthetic shadow dataset, which may comprise highly diverse training images. The synthetic shadow dataset is also referred to herein as a synthetic dataset (SD), and is a dataset which has been created by synthetically adding shadows to shadow-free images, and/or by generating a training pair/triplet using an input shadowed image.

Figure 2:
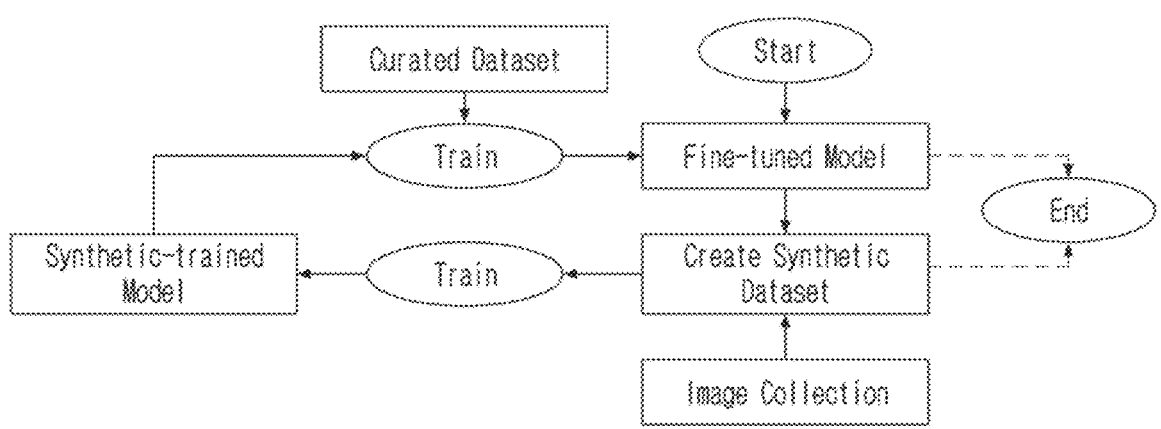
FIG. 2 is a schematic diagram of a pipeline to generate a synthetic dataset and a model for shadow detection (or detection and removal)

FIG. 2 is a schematic diagram of a pipeline to iteratively generate a synthetic dataset and a model for shadow detection (or detection and removal). The present techniques use an initial fine-tuned, pre-trained model (FTM) to isolate shadow-free areas in images and add synthetic shadows, thereby creating a synthetic dataset. The pre-trained model can be improved by using the synthetic dataset during further training. The synthetic dataset is also used to train a synthetically-trained shadow detection model (STM). At the end of the iterative process, a fine-tuned model and a synthetic dataset are obtained.

The pre-trained model is a shadow detection network, i.e. a neural network model which outputs a shadow mask. The pre-trained model has been trained on a curated dataset, i.e. a dataset consisting of training images that was specifically created for the purpose of training a shadow detection (or detection and removal) network.

The reason for using an iterative process is that the shadow masks of the images of the synthetic dataset will be imprecise and contain errors in the beginning. Hence, some of the synthetic shadow-free images patches will contain shadows. The effects of this can be mitigated by creating a large synthetic dataset, however the STM will class these artifacts as special cases. Training a new FTM that is initialised using the weights from the STM results in better performance than that of the initial FTM which has not been trained on the synthetic dataset.

Additionally, when the updated model is used to create a new synthetic dataset, this data set will contain fewer imperfections or errors. An STM that is then trained on this new synthetic dataset can pay less attention to modelling special cases that are due to regions which were classified as shadow-free but were not actually shadow-free.

The iterative process described above can be stopped after a fixed number of iterations or it can be stopped when certain criteria are fulfilled. For example, when the FTM's performance on a test set stops improving, as, for example, measured by the balanced error rate (BER) metric when compared to the previous iteration. In another example, the iterative process is monitored and stopped by tracking the quality of the synthetic dataset (SD), for example, by evaluating the input images through the resulting new FTM at the end of an iteration. The iterative process may then be stopped when a certain performance threshold is reached.

Figure 3:
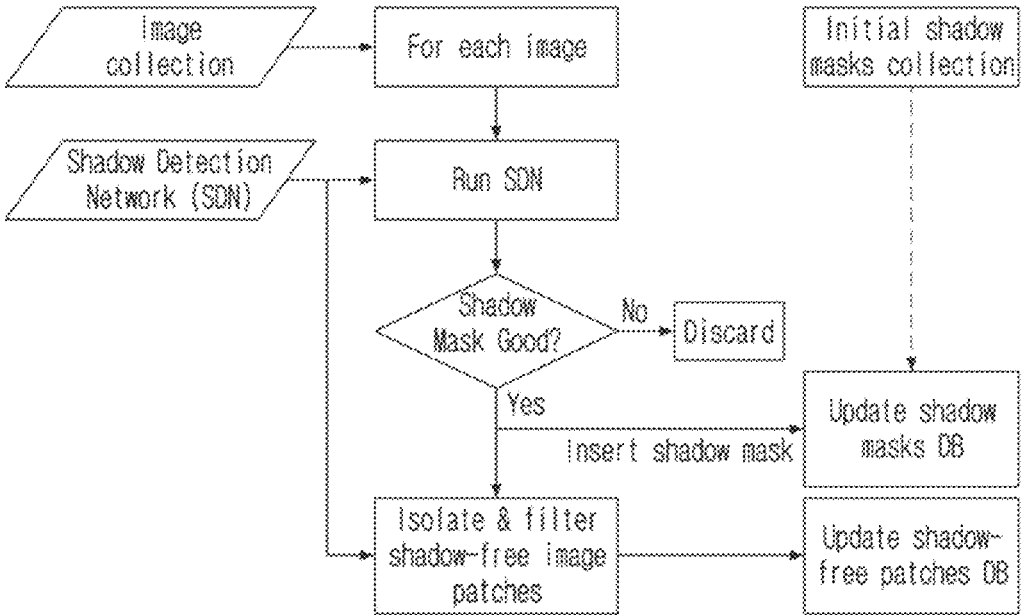
FIG. 3 is a schematic diagram of a more detailed pipeline for generating a synthetic dataset.

FIG. 3 a schematic diagram of a more detailed pipeline for generating a synthetic dataset. After collecting images, an SDN is used on each image to obtain a shadow mask. Then, some heuristics are applied to the mask, which may, for example, include sharpness and/or diffuseness across the image. The heuristics are also used to determine if a shadow mask is deemed acceptable. Only if the shadow mask is deemed acceptable, it is added to a shadow mask database (DB). Shadow-free patches in the corresponding image are isolated and filtered and then also added to a shadow-free patches database.

In the shadow mask database, entries may comprise, for example, binary masks. Entries may also comprise grayscale masks. In the shadow-free patch database, entries may, for example, comprise copies of the image regions—this requires slightly more storage space. Entries in the shadow-free patch database may also comprise an image reference and the position of the shadow-free patch box.

Figure 4A:
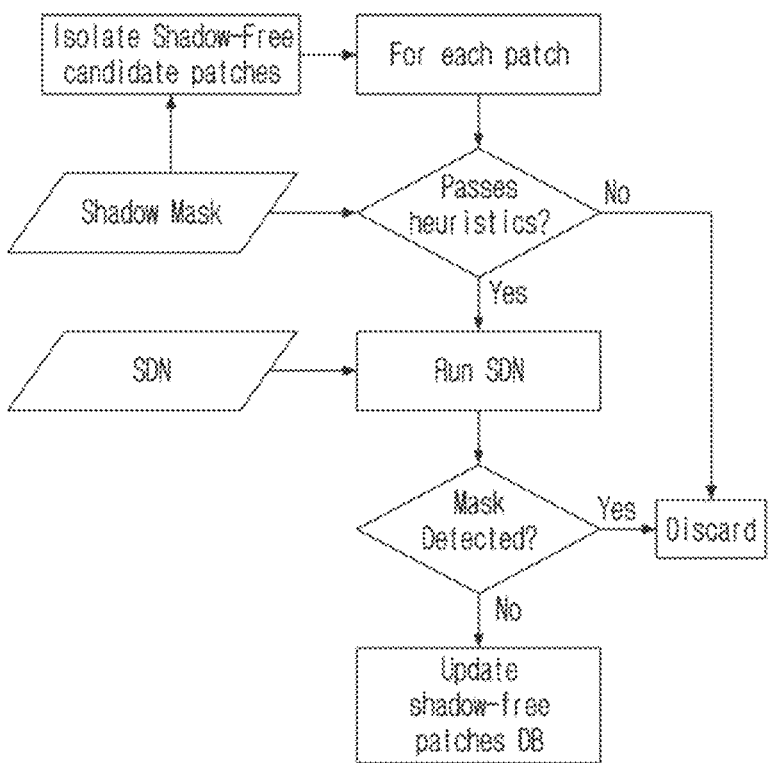
FIG. 4A is a diagram showing steps to isolate shadow-free patches, and FIG. 4B demonstrates the isolation process.
Figure 4B:
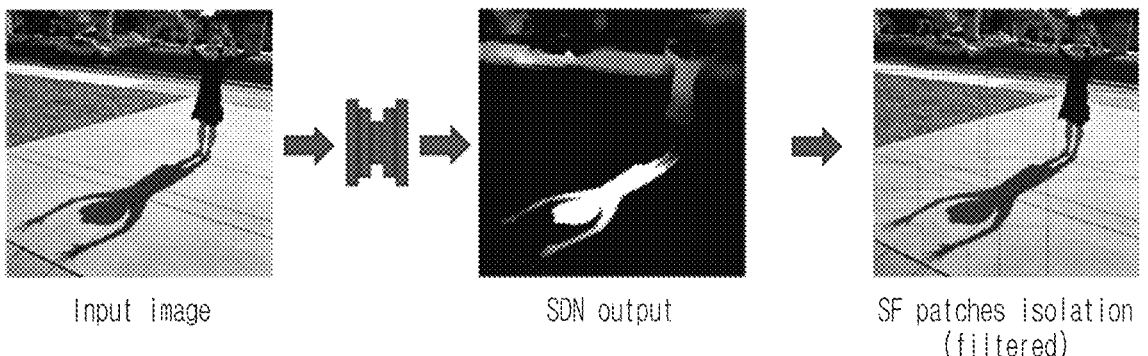

FIG. 4A is a diagram showing steps to isolate shadow-free patches, and FIG. 4B demonstrates the isolation process. First, the largest shadow-free areas of an input image are identified using a shadow detection network (SDN). The shadow-free (SF) regions may also be selected based on values of a corresponding shadow mask being below an acceptable threshold. Candidate shadow-free patches are then filtered based on similarity or intersection-over-union (IOU) metrics to remove similar or highly overlapping patches. The third image of FIG. 4B shows boxes outlining shadow-free patches. In addition to the above steps, the SDN may be run again on each of the shadow-free image patches to validate the absence of shadows.

Figure 5:
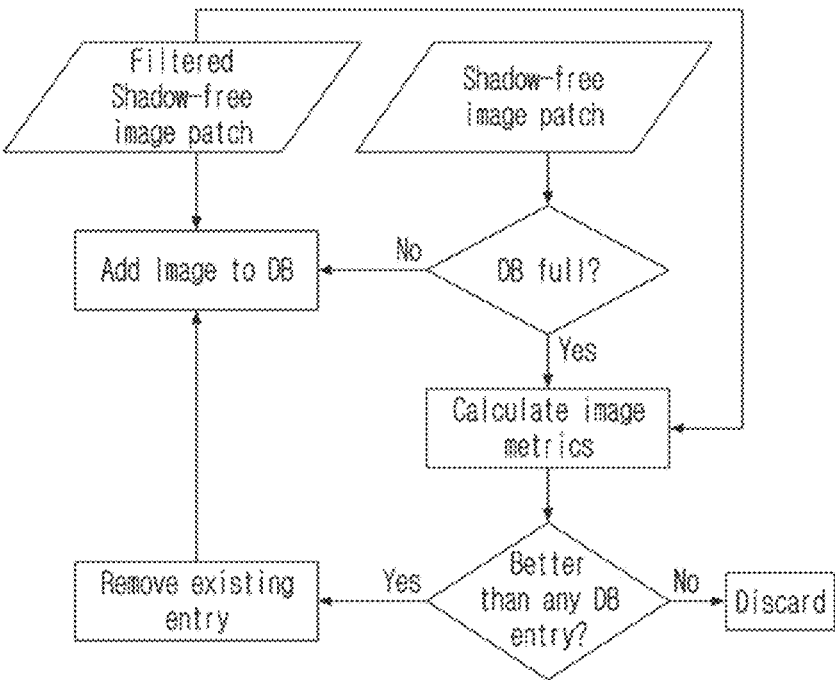
FIG. 5 is a diagram showing steps to manage a shadow-free patch database.

FIG. 5 is a diagram showing steps to manage a shadow-free patch database. The shadow-free patch database may be unconstrained in size, in which case any new shadow-free patch entry is automatically added to the shadow-free patch database. However, if the shadow-free patch database is size-constrained, images may be added to the database only if they satisfy certain predetermined criteria. This is useful, for example, in the case of the database being on a resource-constrained device, such as a smartphone. Only if a new shadow-free patch has image metrics that are better than those of another shadow-free patch database entry, will the new shadow-free patch be added to the database. Image metrics may be uniformity of the image, for example, an image patch containing clear sky will not offer a meaningful challenge to the SDN and therefore is not a good training example. Other criteria may, for example, include image brightness because bright images are more likely to contain shadows and therefore may produce more realistic shadow images.

Figure 6:
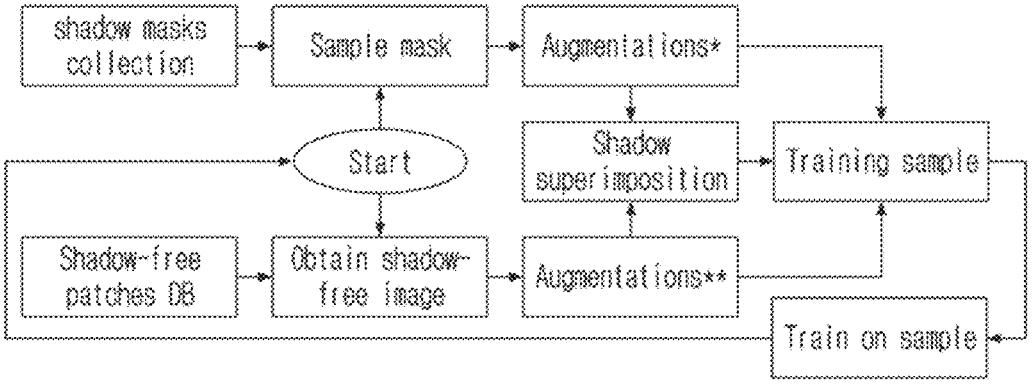
FIG. 6 shows a pipeline for training a shadow detection network (SDN) using synthetic shadow images.

FIG. 6 shows a pipeline for training a SDN using synthetic shadowed images. First, both a shadow-free patch and a shadow mask are sampled from the corresponding databases. The shadow mask may be augmented, for example, by using random crop, affine transformations, morphological transformations, blurring or the identity function. The shadow-free patch may be augmented using, for example, random crop, affine transformations, colour uttering or the identity function.

After augmentation, the shadow-free patch and the shadow mask are superimposed to create a shadow image and hence a training sample. Training may then commence using the created samples.

Figure 7A:
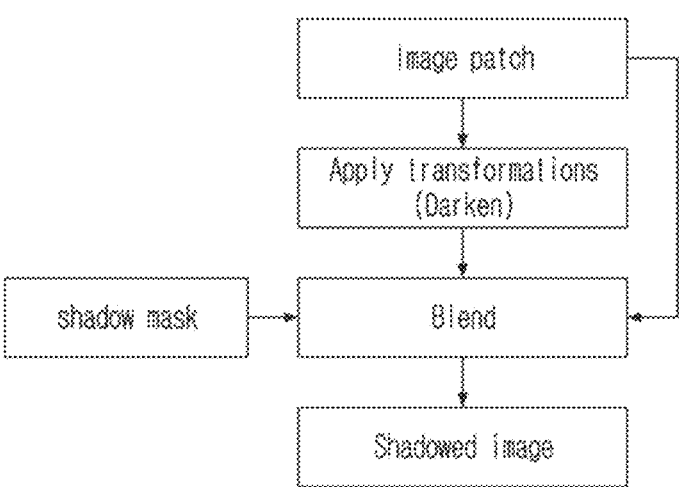
FIGS. 7A and 7B show steps of the shadow superimposition process.
Figure 7B:
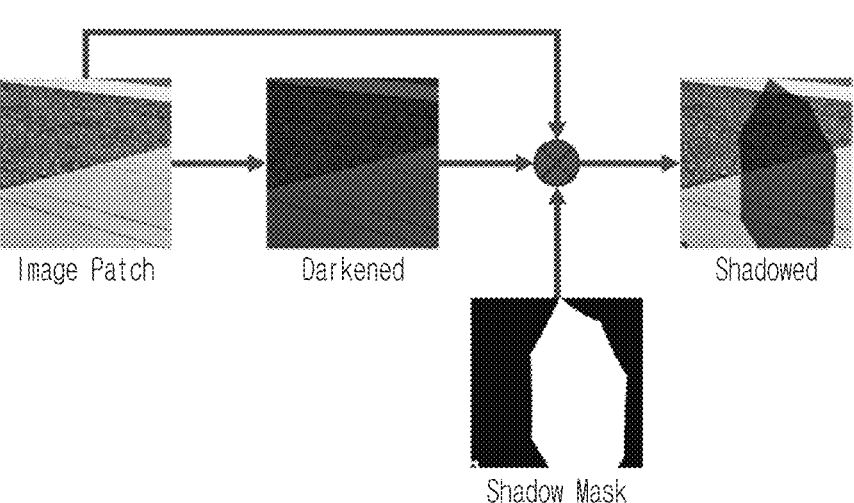

FIGS. 7A and 7B show steps of the shadow superimposition process. The process consists of generating a darker area in a shadow-free patch based on a shadow mask. First, a darkened shadow-free patch is created by applying transformations that reduce, for example, brightness and/or parameters such as contrast, saturation and hue. Then, the darkened shadow-free patch and the shadow-free patch are blended using the shadow mask, such that the resulting image consists of the darkened shadow-free patch where there is meant to be a shadow according to the shadow mask, and the shadow-free patch elsewhere.

Figure 8:
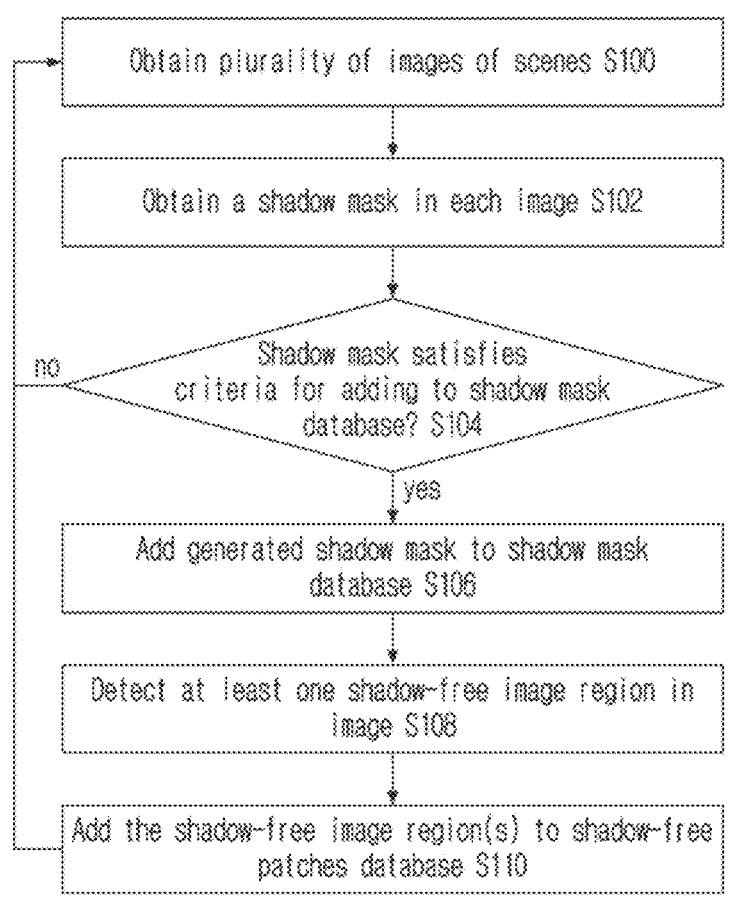
FIG. 8 is a flowchart of example steps to generate a training dataset.

FIG. 8 is a flowchart of example steps to generate a training dataset for training a machine learning, ML, model, optionally using federated learning, to perform image shadow detection and/or removal. The method comprises obtaining a plurality of images of scenes (step S100). The method comprises using a pre-trained shadow detection model to generate a training dataset by: obtaining a shadow mask in each image of the plurality of images (step S102); determining whether the obtained shadow mask satisfies criteria for adding the shadow mask to a database of shadow masks on the client device, the database forming or being used to generate the training dataset (step S104). When the criteria are satisfied by a shadow mask generated for an image, the method comprises: adding the obtained shadow mask to the database of shadow masks (step S106); detecting at least one shadow-free image region in the image (step S108); and extracting and adding the at least one shadow-free image region to a database of shadow-free patches, the database of shadow-free patches forming or being used to generate the training dataset (step S110). If the criteria are not satisfied at step S104, the shadow mask is discarded, and the process returns to step S100.

Step S108 may comprise using the obtained shadow mask to isolate at least one region in the obtained image that contains shadow-free pixels, as shown in FIGS. 3 and 4A. The step of isolating regions that contain shadow-free pixels may comprise isolating regions of at least a predefined minimum size. The method may further comprise filtering the isolated regions to remove similar or overlapping regions. The isolated regions that remain after the filtering may be added to the database of shadow-free patches. Alternatively, the method may further comprise checking for shadows in the isolated regions that remain after the filtering by using the pre-trained shadow detection model. In this case, the method may comprise extracting and adding any isolated regions to the database of shadow-free patches that the checking determines to be free of shadows.

In some cases, the database of shadow-free patches and the database of shadow masks may be used to generate the training dataset by adding the obtained shadow mask and the at least one shadow-free image region to the training dataset as data pairs. Alternatively, as noted above, the database of shadow-free patches and the database of shadow masks may be used to generate synthetic data (images) that forms the training dataset. Thus, the method may further comprise: generating a synthetic image having a shadow using a shadow-free image region from the database of shadow-free patches and a shadow mask from the database of shadow masks. In this case, the synthetic image and the shadow mask used to generate the synthetic image may be added to the training dataset as data pairs.

The techniques to generate the synthetic image may be as described above with reference to FIGS. 6 to 7B. That is, the generating may comprise applying the shadow mask to the shadow-free image region to form a darker area in the shadow-free image region. The generating may comprise applying at least one transformation to the shadow-free image region prior to applying the shadow mask. The at least one transformation may be used to for any one of the following: reduce brightness, change contrast, change saturation, and change hue. The method may further comprise adding the generated synthetic image to the training dataset.

Using synthetic datasets for training may be especially useful in a federated learning scenario. ML algorithms usually perform best when the data of the task they perform closely matches the data used to train them. Hence, if an SDN is intended for use on a user's images that are stored on a mobile device, it is advantageous if the training data closely resembles the user's images. However, simply using images taken by a user presents privacy issues which is why it is desirable for the images to remain on the user's local device, not be transferred to a server.

Figure 9:
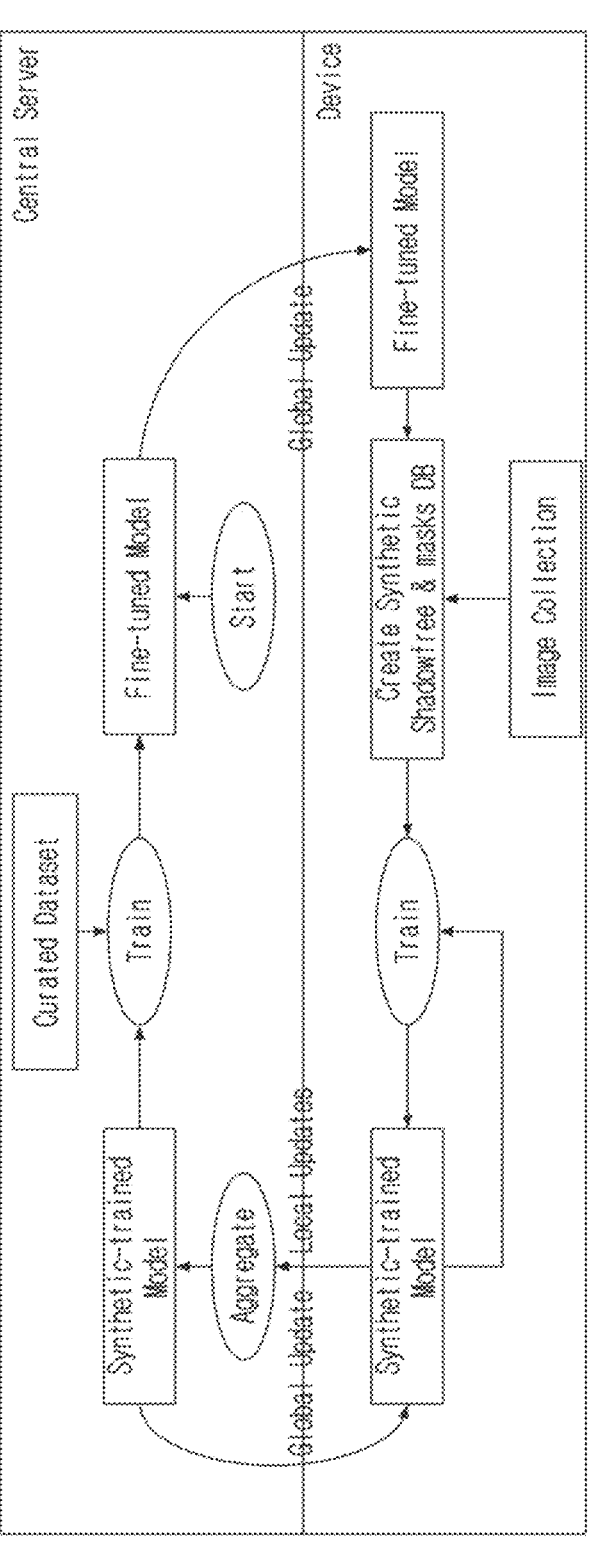
FIG. 9 is a schematic diagram showing how a federated learning process may be implemented between a server and user device.

Federated learning provides a solution to this problem by keeping user data private while still being able to use it for training a ML model. FIG. 9 is a schematic diagram showing how a federated learning process may be implemented between a server and user device. For example, in practice the claimed invention may be used to exploit images on user devices for training of a ML model. Each user device is then responsible for generating a synthetic dataset using local images S810, S812, S814, S816, S818 and an FTM trained S806 on, and obtained from a server S808. An STM S820 is then trained on the user device and periodically updated with an STM from the server. In this scenario, only the server would be responsible for producing an FTM and would do so using aggregated weights S822 from a plurality of STMs trained on different user devices. "Weights" refers to any parameter of the ML model that is obtained by training the ML model. At the end of a training iteration, a new FTM would then be distributed from the server to the user devices S824.

In the above federated learning scenario, the FTM distributed to user devices by the server may also be applied to detecting and/or removing shadows on the user's images, not just for creating a shadow dataset and training an STM. That is, the FTM on a user's device may serve the dual purpose of performing useful tasks for the user when editing images in a user device's image gallery, while also improving the overall performance of shadow detection and removal methods by creating a synthetic dataset.

In the above federated learning scenario, there may also be checks in place to ensure that the server only uses the weights from those STMs that are trained on a shadow dataset which was produced by the most up to date FTM.

FIG. 9 shows an overview of the iterative shadow dataset creation process when used in a centralised federated learning approach. The steps involved are divided into steps performed on a central server and steps performed on a client device.

Figure 10:
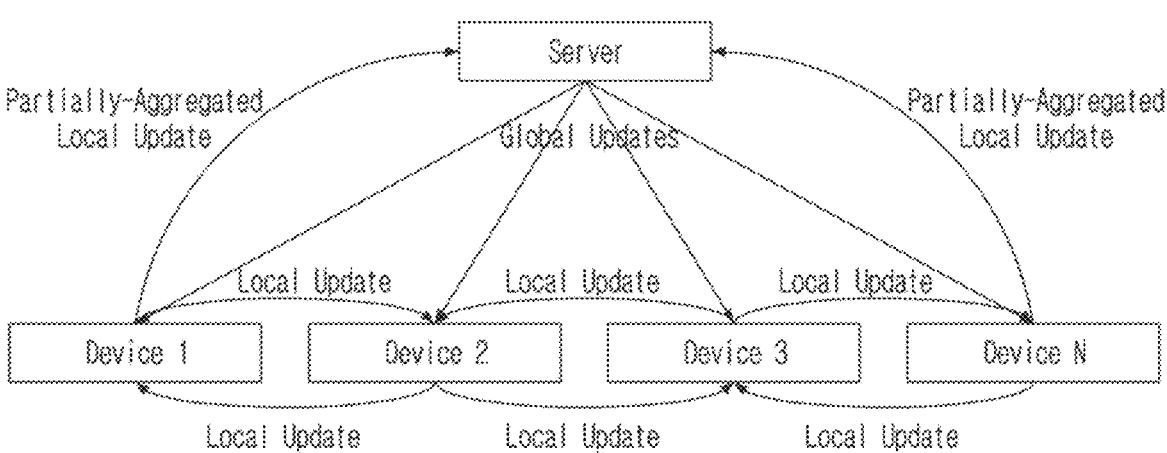
FIG. 10 shows an overview of how a distributed federated learning approach might be used.

FIG. 10 shows an overview of how a distributed federated learning approach might be used. In this scenario, the weights of STMs that are trained on individual user devices are aggregated between devices or device clusters first. Only certain devices or certain devices within a device cluster then send the weight updates to the server. The advantage of using a distributed federated learning approach is that it reduces the bandwidth and load applied to the server.

Figure 11:
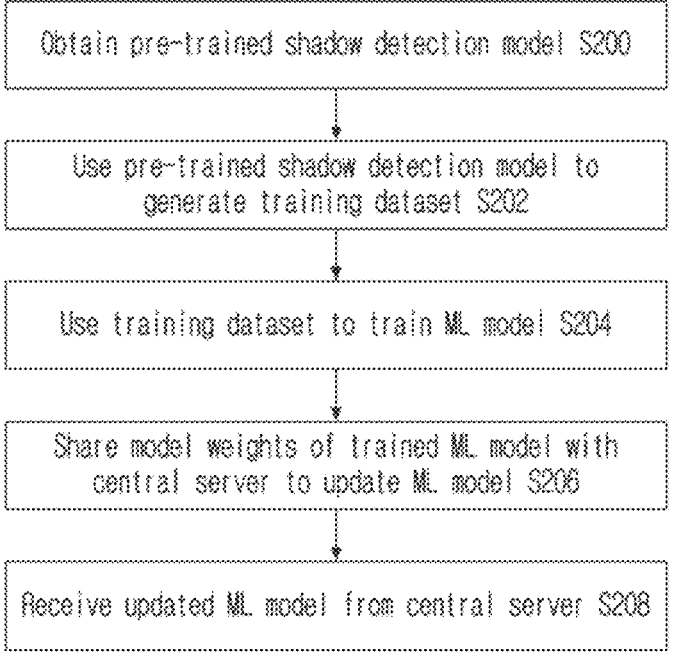
FIG. 11 shows a flowchart of example steps to train a ML model for shadow detection using federated learning.

FIG. 11 shows a flowchart of example steps to train a ML model for shadow detection and/or removal using federated learning. The method is performed by a client device, and comprises: obtaining a pre-trained shadow detection model from a central server (step S200); using the pre-trained shadow detection model to generate a training dataset using the method recited herein, such as that described above with respect to FIG. 8 (step S202); using the training dataset to train the ML model (step S204); and sharing model weights of the trained ML model with the central server to update the ML model (step S206); and receiving the updated ML model from the central server (step S208).

The method may further comprise: checking whether computational resources of the client device are available to train the ML model; and training the ML model when the resources are available.

The step of sharing model weights of the trained ML model with a central server (step S206) may comprise: transmitting the model weights to the central server directly. This is the process shown in FIG. 9.

Alternatively, the step of sharing model weights of the trained ML model with a central server (step S206) may comprise: transmitting the model weights to at least one other client device of a plurality of client devices using a peer-to-peer distribution mechanism, wherein one client device of the plurality of client devices aggregates all model weights and transmits the aggregated model weights to the central server. This is the process shown in FIG. 10.

Figure 12:
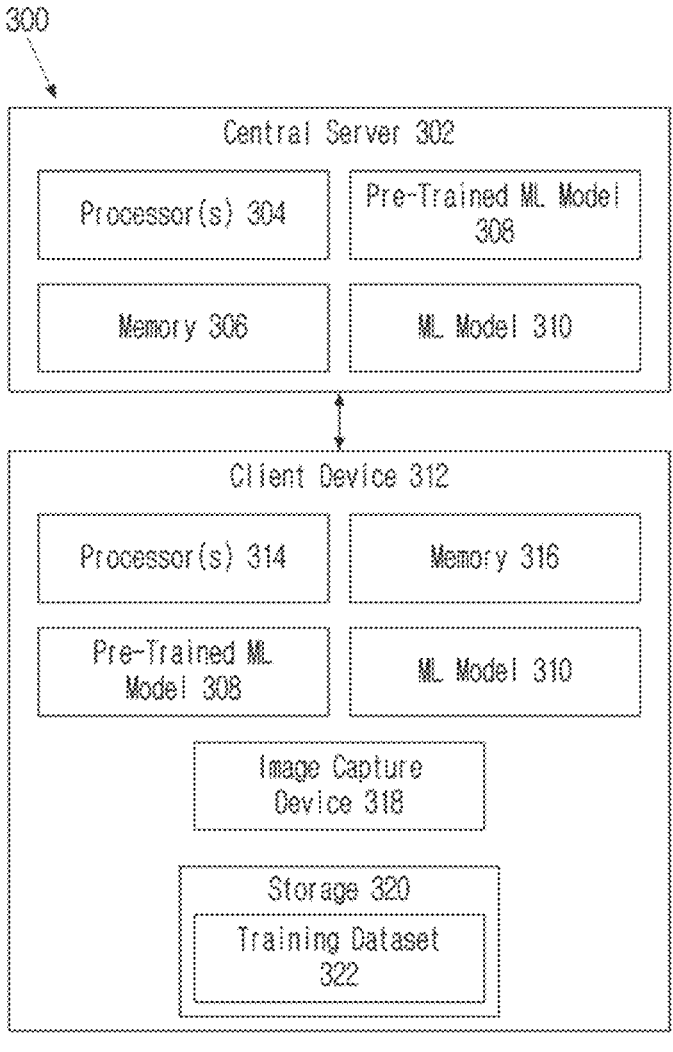
FIG. 12 is a block diagram of a system for training a ML model for shadow detection using federated learning.

FIG. 12 is a block diagram of a system 300 for training a ML model for shadow detection using federated learning. The system comprises central server 302 comprising at least one processor 304 coupled to memory 306, and storing a pre-trained shadow detection model 308 and an ML model 310 for training.

The system comprises a plurality of client devices 312. Only one client device is shown in FIG. 12 for the sake of simplicity.

The client device 312 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example client devices.

Each client device 312 comprises at least one processor 314 coupled to memory 316. The at least one processor 314 may comprise one or more of: a microprocessor, a microcontroller, and an integrated circuit. The memory 316 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example. The processor 312 may be arranged to perform the steps described above with reference to FIGS. 8 and 11. For the sake of simplicity, these methods are not described again here.

The client device 312 may further comprise at least one image capture device 318 for capturing images or videos to be used to generate synthetic data. The synthetic data is the training dataset 322, which is stored in storage 320. Images captured by the client device may be filtered according to whether or not they are suitable for the training dataset 322, according to certain criteria. These criteria may include the time at which the image was taken, where daytime may be preferred, the resolution of the image and/or the average brightness of the image, where low brightness images may be discarded. Images may also be filtered using a sample run of the FTM 308, where, for example, the shadow mask that is created for each image is be evaluated. Images may then be discarded or included based on, for example, whether the shadow mask is blurry or diffuse.

FIGS. 13A and 13B show how using a synthetic shadow dataset can improve various performance metrics. FIG. 13A shows performance for a ML model only trained on the ISTD shadow dataset, which is a curated shadow dataset, whereas FIG. 13B shows performance for the same ML architecture pretrained on a synthetic dataset and fine-tuned using the ISTD dataset. Several performance metrics are shown, one being the Peak Signal-to-Noise Ratio (PSNR), which is a measure of the overall quality of the prediction, where a higher value indicates better performance. The Mean Average Error (MAE) is a measure of the L1 loss between prediction and ground truth, where a lower value indicates higher performance. The Balanced Error Rate (BER) is a metric for shadow detection pixel classification, where a lower value indicates higher performance.

FIGS. 14A and 14B show the performance improvement that can be achieved when using a synthetic dataset. As per FIGS. 13A and 13B, it can be seen that training on a synthetic shadow dataset improves performance.

The methods proposed above can improve the results of any shadow detection or removal network—they are not limited to one specific architecture. The advantage of the claimed invention is that it proposes a fully automated process for creating a synthetic shadow dataset that improves with each iteration. There is not requirement for a human-in-the-loop to, for example, label images.

Pre-training a SDN: As mentioned above, the real-life datasets for shadow removal and detection are quite small (e.g. 10K and 4K for detection and removal respectively). An alternative is to synthetically generate datasets, but existing ones suffer from limited shadow-free image variety (e.g. 1.8K images). One can simply collect more images as shadow-free images, but this can introduce noise since images might already have shadows, and synthesizing synthetic shadows will lead to models learning incorrect mappings.

As described above, a new pipeline is proposed for a working compromise; ability to leverage any image for dataset generation while keeping the noise (i.e. existing shadows) at minimum. The aim is to create a dataset of triplets in the form of ($x^s$, $x^{ns}$, m), with $x^s \in \mathbb{R}^{H \times W \times 3}$, $x^{ns} \in$ $\mathbb{R}^{H \times W \times 3}$ and m $\in \mathbb{R}^{H \times W}$, corresponding to shadowed, shadow-free and shadow mask images. This is facilitated with a two-stage process; shadow-free patch extraction and shadow superimposition.

Shadow-free patch extraction. For each image $I^{src} \in \mathbb{D}^{src}$, a pre-trained shadow detection model M is run to obtain a shadow mask. This shadow mask is additionally refined via a Conditional Random Field (CRF) model to improve its precision, and it is thresholded to remove low-confidence areas.

$$m^{src} = \text{thresh}(\text{CRF}(M(I^{src}), I^{src})) \tag{1}$$

All the regions in the mask without shadows are identified; the largest square bounding boxes in the mask that do not intersect shadow pixels are identified, and highly over-lapping candidates are filtered out according to intersection-over-union (IOU) metric and require a minimum patch size. In the pipeline, a minimum IOU threshold of 0.3 and a minimum size of 128 pixels is set, and up to 10 patches per input image are extracted. The coordinates of the resulting boxes are used to sample the input image, giving us $Nx^{ns}$, where N is the number of patches that meet the acceptance criteria.

Shadow Superimposition. A modified version of $x^{ns}$ is then generated by applying a sequence of operations aimed at approximating the shadow areas. There is no attempt to only constrain the light model to ambient light. Instead, the following parameters are allowed to be altered: warmth, hue, saturation and lightness. The warmth is altered by modifying the red and blue channels of the image. For the latter, the image is first converted into HSV format, each channel is modified independently, and then it is converted back to its BGR format. The resulting output is called $x^{dark}$.

While the results produced could appear unrealistic under certain combination, it is possible to approximate different light colors and improve the model resilience to slight color variations in the shadow areas. Finally, a shadow mask database $\mathbb{D}^{mask}$ is obtained to obtain a shadow mask:

$$m = F(\text{sample}(\mathbb{D}^{mask})) \tag{2}$$

where F is a function that applies random transformations (flips and rotations) to the sampled mask. The shadow mask m is used to determine the shadow image via the following blending operation.

$$x^s = x^{dark} \times m + x^{ns} \times (1 - m) \tag{3}$$

The mask database is initially comprised of mask images proposed in Inoue et al (Inoue, N., Yamasaki, T.: Learning from synthetic shadows for shadow detection and removal. IEEE Transactions on Circuits and Systems for Video Technology 31(11), 4187-4197 (2020)), totaling 10000 masks. During the dataset generation process, it is further expanded by inserting the shadow masks $m^{src}$ produced by M. By the end of the dataset creation, more than 20000 masks will be added.

Experiments. Experiments are conducted on ISTD [Wang, J., Li, X., Yang, J.: Stacked conditional generative adversarial networks for jointly learning shadow detection and shadow removal. In: Proceedings of the IEEE Conference on Computer Vision and Pattern Recognition. pp. 1788-1797 (2018)] and SRD (Qu, L., Tian, J., He, S., Tang, Y, Lau, R. W.: Deshadownet: A multi-context embedding deep network for shadow removal. In: Proceedings of the IEEE Conference on Computer Vision and Pattern Recognition. pp. 4067-4075 (2017)). ISTD consists of 1870 image triplets (1330 train, 540 test) and allows training/evaluation for detection and removal. The color-corrected version of the ISTD testing set is used (A-ISTD). SRD is formed of 3088 image pairs (2680 train, 408 test) and allows for removal training and evaluation. Masks are generated for the SRD dataset to evaluate or R(·) that takes in a mask input. In addition to adaptively thresholding the difference between shadow and shadow-free images, the masks are manually inspected and either i) manually correct the ones with minor errors or ii) annotate from scratch the ones with incorrect masks. For the latter, tools for pixel-level annotation are used and then mask filling is performed via flood fill and noise reduction via median filtering. The same dataset is used for pretraining, where stated.

Evaluation Metrics. For removal, mean absolute error (MAE) is used in LAB space for shadow, non-shadow and all regions. For detection, the balanced error rate (BER) is used. Images are resized to (256×256) for evaluation. In D(·), no postprocessing/dilation is used on the predicted masks.

Network architecture. The model can be plugged into any network architecture, but as a primary solution, a lightweight architecture is used. The lightweight model proposed in Yucel et al (Yucel, M. K., Dimaridou, V., Drosou, A., Saa-Garriga, A.: Real-time monocular depth estimation with sparse supervision on mobile. In: Proceedings of the IEEE/ CVF Conference on Computer Vision and Pattern Recognition. pp. 2428-2437 (2021)), which is an efficient dense prediction network based on a MobileNetv2 encoder and FBNet based decoder. The same architecture is used for both R(·) and D(·), where the differences between the two are the number of input channels (3 and 4 for D(·) and R(·), respectively) and R(·) having XAR.

The encoder of both networks is initialised with ImageNet weights and the rest initialised with He et al (He, K., Zhang, X., Ren, S., Sun, J.: Delving deep into rectifiers: Surpassing human level performance on ImageNet classification. In: Proceedings of the IEEE international conference on computer vision. pp. 1026-1034 (2015)). Both networks are trained using PyTorch jointly for 2000 epochs using a batch size of 16, where learning rates for both are set to 2e–4. Images are resized to (286×286), randomly cropped to (256×256) and augmented (random horizontal flipping) before training, and Adam optimizer is used with $\ell_1$ loss for both networks. We use early stopping with a validation split from the training set (20% hold-out ratio). For ISTD and SRD, the models are trained separately. When indicated, the models are pretrained for 350 epochs on the synthetic dataset using the same hyperparameters described above.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method, performed by a client device, for generating a training dataset for training a machine learning (ML) model to perform image shadow detection, the method comprising:

obtaining a plurality of images of scenes; and generating, using a pre-trained shadow detection model, a training dataset by:

obtaining a shadow mask for each image of the plurality of images;

determining whether the obtained shadow mask satisfies criteria for adding the shadow mask to a database of shadow masks on the client device, the database of the shadow masks forming or being used to generate the training dataset; and based on the criteria being satisfied by the obtained shadow mask for an image:

adding the obtained shadow mask to the database of the shadow masks;

detecting at least one shadow-free image region in the image; and extracting and adding the at least one shadow-free image region to a database of shadow-free patches, the database of the shadow-free patches forming or being used to generate the training dataset.

2. The method as claimed in claim 1, wherein the detecting the at least one shadow-free image region in the obtained image comprises:

isolating, using the obtained shadow mask, at least one region in the obtained image that contains shadow-free pixels.

3. The method as claimed in claim 2, wherein the isolating the at least one region that contains shadow-free pixels comprises isolating regions of at least a predefined minimum size.

4. The method as claimed in claim 3 further comprising filtering the isolated regions to remove overlapping regions.

5. The method as claimed in claim 4 further comprising adding the isolated regions that remain after the filtering to the database of the shadow-free patches.

6. The method as claimed in claim 4 further comprising checking for shadows in the isolated regions that remain after the filtering by using the pre-trained shadow detection model.

7. The method as claimed in claim 6 further comprising extracting and adding any isolated regions to the database of the shadow-free patches that the checking determines to be free of shadows.

8. The method as claimed in claim 1 further comprising:

determining whether there is sufficient space in the database of the shadow-free patches to store the at least one shadow-free image region; and based on determining that there is insufficient space in the database of the shadow-free patches to store the at least one shadow-free image region:

calculating image metrics for the at least one shadow-free image region;

identifying whether there is a lower priority shadow-free image region in the database; and removing the lower priority shadow-free image region and storing the at least one shadow-free image region in the database of the shadow-free patches, based on the lower priority shadow-free image region being identified.

9. The method as claimed in claim 1, wherein the database of the shadow-free patches and the database of the shadow masks are used to generate the training dataset by adding the obtained shadow mask and the at least one shadow-free image region to the training dataset as data pairs.

10. The method as claimed in claim 8 further comprising:

generating a synthetic image having a shadow using a shadow-free image region from the database of the shadow-free patches and a shadow mask from the database of the shadow masks.

11. The method as claimed in claim 10, wherein the generating comprises applying the shadow mask to the shadow-free image region to form a darker area in the shadow-free image region.

12. The method as claimed in claim 11, wherein the generating comprises applying at least one transformation to the shadow-free image region prior to applying the shadow mask.

13. The method as claimed in claim 12, wherein the at least one transformation is used to for any one of the following: reduce brightness, change contrast, change saturation, and change hue.

14. The method as claimed in claim 10 further comprising adding the generated synthetic image to the training dataset.

15. A client device for generating a training dataset for training a machine learning (ML) model to perform image shadow detection, the client device comprising:

an image capture device, for capturing a plurality of images of scenes;

storage comprising a plurality of databases forming or being used to generate a training dataset for training the ML model; and at least one processor coupled to memory and arranged to:

use a pre-trained shadow detection model to generate a training dataset by:

obtaining a shadow mask for each image of the plurality of images;

determining whether the obtained shadow mask satisfies criteria for adding the shadow mask to a database of shadow masks stored in the storage on the client device; and based on the criteria being satisfied by the obtained shadow mask for an image:

adding the obtained shadow mask to the database of the shadow masks;

detecting at least one shadow-free image region in the image; and extracting and adding the at least one shadow-free image region to a database of shadow-free patches stored in the storage on the client device.

16. A computer-implemented method, performed by a client device, for training a machine learning (ML) model using federated learning to perform image shadow detection, the method comprising:

obtaining a pre-trained shadow detection model from a central server;

generate, using the pre-trained shadow detection model, a training dataset by:

obtaining a plurality of images of scenes; and obtaining a shadow mask for each image of the plurality of images;

determining whether the obtained shadow mask satisfies criteria for adding the shadow mask to a database of shadow masks on the client device, the database of the shadow masks forming or being used to generate the training dataset; and based on the criteria being satisfied by the obtained shadow mask for an image:

adding the obtained shadow mask to the database of the shadow masks;

detecting at least one shadow-free image region in the image; and extracting and adding the at least one shadow-free image region to a database of shadow-free patches, the database of the shadow-free patches forming or being used to generate the training dataset;

using the generated training dataset to train the ML model;

sharing model weights of the trained ML model with the central server to update the ML model; and receiving the updated ML model from the central server.

17. The method as claimed in claim 16, further comprising:

checking whether computational resources of the client device are available to train the ML model; and training the ML model when the resources are available.

18. The method as claimed claim 16, wherein the sharing the model weights of the trained ML model with the central server comprises:

transmitting the model weights to the central server directly.

19. The method as claimed in claim 16, wherein the sharing the model weights of the trained ML model with the central server comprises:

transmitting the model weights to at least one other client device of a plurality of client devices using a peer-to-peer distribution mechanism, wherein one client device of the plurality of client devices aggregates all model weights and transmits the aggregated model weights to the central server.

20. A non-transitory computer-readable storage medium comprising instructions which, when executed by a processor, causes the processor to perform the method of claim 1.

* * * * *